(12) United States Patent
Kubacki et al.

(10) Patent No.: US 12,638,097 B2
(45) Date of Patent: May 26, 2026

(54) SAFETY DEVICE FOR A LINEARLY ACTUATED PROCESS VALVE

(71) Applicant: Robert Bosch GmbH, Stuttgart (DE)

(72) Inventors: Markus Kubacki, Wuerzburg (DE); Gottfried Hendrix, Gemuenden (DE); Alexandre Orth, Hettstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/835,646

(22) PCT Filed: Feb. 1, 2023

(86) PCT No.: PCT/EP2023/052432
§ 371 (c)(1),
(2) Date: Aug. 2, 2024

(87) PCT Pub. No.: WO2023/148212
PCT Pub. Date: Aug. 10, 2023

(65) Prior Publication Data
US 2025/0146596 A1 May 8, 2025

(30) Foreign Application Priority Data
Feb. 7, 2022 (DE) ..................... 10 2022 201 230.5

(51) Int. Cl.
*F16K 31/122* (2006.01)
*F16K 31/00* (2006.01)

(52) U.S. Cl.
CPC ........ *F16K 31/1221* (2013.01); *F16K 31/003* (2013.01)

(58) Field of Classification Search
CPC .. F16K 31/1221; F16K 31/363; F16K 31/406; F16K 31/003; F16K 37/0041;
(Continued)

(56) References Cited

U.S. PATENT DOCUMENTS 4,650,151 A * 3/1987 McIntyre ................ E21B 34/04
251/63.5
4,651,970 A 3/1987 Sadler
(Continued)

FOREIGN PATENT DOCUMENTS

DE 10 2020 200 263 A1 7/2021
EP 2 989 360 B1 3/2016
(Continued)

OTHER PUBLICATIONS

International Search Report corresponding to PCT Application No. PCT/EP2023/052432, mailed May 8, 2023 (German and English language document) (7 pages).

*Primary Examiner* — Daphne M Barry
(74) *Attorney, Agent, or Firm* — Maginot, Moore & Beck LLP

(57) ABSTRACT
A safety device for a linearly actuated process valve and a system including the safety device are disclosed. The safety device includes a housing, a piston rod which is mounted in the housing so as to be linearly displaceable and connectable to the process valve, and a piston which is connected to the piston rod. Furthermore, at least one spring is arranged in the housing of the safety device. The spring is clamped between the piston and an end face of the housing. The safety device also has a first mechanical interface by way of which the safety device can be detachably connected to a linear actuator.

8 Claims, 6 Drawing Sheets

(58) Field of Classification Search

CPC .. F16K 37/0008; E21B 33/035; F15B 33/035; F15B 1/022; F15B 15/1463; F15B 15/2615; F15B 20/002; F15B 20/004

See application file for complete search history.

(56) References Cited

U.S. PATENT DOCUMENTS

| | | | | |
|---|---|---|---|---|
| 4,744,386 | A * | 5/1988 | Frazer | F16K 31/1221 137/315.31 |
| 4,809,733 | A * | 3/1989 | Hawkins | E21B 34/02 92/60 |
| 5,244,004 | A * | 9/1993 | Robertson | F15B 20/00 60/329 |
| 6,041,804 | A * | 3/2000 | Chatufale | F16K 31/1221 92/13 |
| 6,352,239 | B1 * | 3/2002 | McIntosh | F15B 15/1457 251/64 |
| 6,783,107 | B2 * | 8/2004 | Chatufale | F15B 1/24 251/63.5 |
| 7,913,971 | B2 * | 3/2011 | Hoang | F16K 31/1221 251/63 |
| 8,596,608 | B2 * | 12/2013 | Grimseth | E21B 34/04 251/74 |
| 9,841,117 | B2 * | 12/2017 | Sundararajan | F16K 31/1221 |
| 2002/0124889 | A1 * | 9/2002 | Sundararajan | F16K 37/0008 137/559 |
| 2002/0139948 | A1 * | 10/2002 | Hademenos | F15B 15/1476 251/63.6 |
| 2007/0095411 | A1 | 5/2007 | Arnison et al. | |
| 2016/0245425 | A1 | 8/2016 | Heyn | |

FOREIGN PATENT DOCUMENTS

| | | |
|---|---|---|
| WO | 02/081932 A2 | 10/2002 |
| WO | 2018/192747 A1 | 10/2018 |
| WO | 2018/192749 A1 | 10/2018 |

* cited by examiner

SAFETY DEVICE FOR A LINEARLY ACTUATED PROCESS VALVE

This application is a 35 U.S.C. § 371 National Stage Application of PCT/EP2023/052432, filed on Feb. 1, 2023, which claims the benefit of priority to Serial No. DE 10 2022 201 230.5, filed on Feb. 7, 2022 in Germany, the disclosures of which are incorporated herein by reference in their entirety.

The present disclosure relates to a safety device for a linearly actuated process valve and a system comprising the safety device.

BACKGROUND

Process valves are used in oil or natural gas extraction systems that are operated at great depths at sea to regulate or shut off the volume flow of the medium to be extracted. These process valves are operated by means of electrohydraulic actuators, such as a hydrostatic linear actuator. This can contain a hydraulic cylinder with one or more springs, which move the piston of the hydraulic cylinder to a predetermined position if the hydraulic drive fails. This brings the process valve into a safe position in the event of a fault.

DE 10 2020 200 263 A1 shows a hydrostatic linear actuator that exerts a tensile force on a safety-relevant component in an emergency, wherein the tensile force is initially generated by an emergency spring that relaxes. In a final part of the movement, a hydraulic accumulator is switched on via a travel-dependent control system, the pressure medium of which is conveyed into a cylinder chamber that acts on a piston to which the component is coupled.

A disadvantage of a linear actuator according to DE 10 2020 200 263 A1 is its increased weight due to the safety components integrated in the actuator (spring systems, additional hydraulic components). This makes it difficult to replace a defective linear actuator at great depths using an underwater vehicle (Remote Operated Vehicle—ROV).

SUMMARY

According to the disclosure, a safety device for a linearly actuated process valve and a system comprising the safety device are proposed with the features of the independent patent claims. Advantageous embodiments are the subject of the dependent claims and the following description.

The disclosure provides a compact and simple safety device for linearly actuated process valves as a separate module that has purely mechanical properties (i.e. does not include an electrical, hydraulic or pneumatic drive unit). The safety device can be arranged between a linear actuator and a process valve by means of standard mechanical interfaces.

The safety device for a linearly actuated process valve comprises a housing and a piston rod, which is mounted in the housing so as to be linearly displaceable and can be connected to the process valve. The piston rod of the safety device can be connected to a shut-off device of the process valve by means of a mechanical connection, for example. The mechanical connection can, for example, be a connection made by means of a second mechanical interface, a screw connection or a welded connection. Preferably, the process valve is a disk valve that uses a disk as a shut-off device.

Furthermore, the safety device contains a piston which is connected to the piston rod and at least one spring which is clamped between the piston and an end face of the housing. This means that the piston rod with the piston is held in a predetermined position (end position) by the spring force as long as no external force acts on the piston rod against and greater than the spring force. Preferably, a process valve connected to the safety device is in a safe position at this end position of the piston rod. The safe position is preferably a closed position of the process valve.

Furthermore, the safety device comprises a first mechanical interface by means of which the safety device can be detachably connected to a linear actuator. Preferably, the first and/or second mechanical interface can contain a quick-release fastener, in particular a twist lock (i.e. a connection that can be locked by rotating one of the components involved, preferably by a maximum of 360°, a maximum of 180°, a maximum of 90° or a maximum of) 45°, e.g. a bayonet lock or a quick-release fastener in accordance with EN ISO 13628-8, "Linear (push) interface", type A or type C. This quick-release fastener contains a flange with recesses on one side, which is arranged around a first shaft. Claw-shaped projections of a second shaft of an opposite side can be inserted axially into the recesses of the flange and the two sides of the quick-release fastener can be connected to each other by turning the second shaft 45° clockwise. By rotating the second shaft by 45° clockwise, its claw-shaped projections lie axially and radially against the flange of the first shaft, so that a positive connection is created between the two sides of the quick-release fastener.

The safety device can have one side of the quick-release fastener described above, and a linear actuator to which the safety device can be connected can have the second side of the quick-release fastener.

The first mechanical interface makes it possible to exchange a linear actuator connected to the safety device with an ROV without having to remove or open the safety device. This significantly simplifies the maintenance and installation of linear actuators, especially at great depths.

The safety device offers a very simple and compact fail-safe mechanism that is based on proven springs and does not require an electric, pneumatic or hydraulic drive. The spring force of the at least one spring in the safety device automatically moves the process valve to a predefined position (e.g. open or closed) if the actuating force drops (e.g. in the event of an actuator fault, power failure, deactivation or removal of the actuator). The modular design of the components, which provides for the safety device separately from a linear actuator, can be used to simplify the design of new systems or to retrofit existing ones.

According to a preferred embodiment, the safety device comprises a pretensioning means which is designed to pretension the at least one spring of the safety device independently of any movement of the piston rod. This makes it possible to actuate the piston rod to open the process valve with less force, as the spring force does not have to be overcome. Consequently, a linear actuator that is connectable to the safety device to actuate the process valve can be made smaller.

The pretensioning means can preferably have a shaft that acts on the piston and exerts a force on the spring. This is a simple and compact means of providing the pretensioning force.

The shaft can preferably extend outwards through the housing so that it can be actuated from the outside. This means that no force-generating means, such as a hydraulic drive, is required within the safety device.

The shaft preferably has a third mechanical interface for detachable connection to an external drive, for example to a hydraulic drive of the linear actuator that can be connected to the safety device.

Preferably, the housing of the safety device is filled with a hydraulic fluid. The hydraulic fluid is preferably used to resist external pressure acting on the safety device and to protect against corrosion and lubricate the elements of the safety device. The hydraulic fluid can be hydraulic oil, for example.

According to a further preferred embodiment, the safety device comprises a pressure compensation device which is designed to equalize the pressure between the surroundings and an interior of the safety device. Preferably, the pressure compensation device is a diaphragm accumulator or a bladder accumulator which has a fluid connection with a housing opening. The pressure compensation device is preferably a bladder accumulator. The bladder accumulator can be designed with a flexible wall that encloses a predeterminable bladder accumulator volume and can move axially and radially in response to the pressure prevailing inside the accumulator. The flexible wall of the bladder accumulator can be made of an elastomer, for example, and designed to be fluid-tight and resistant to contact with seawater under high pressure.

The pressure compensation device is particularly advantageous when using the safety device in underwater applications.

Preferably, the pressure compensation device is set up to adjust a pressure in the interior of the safety device in a range between ambient pressure and 10 bar above the ambient pressure. This can be done, for example, by means of a spring that pretensions a diaphragm attached to the pressure compensation device. The pressure inside the pressure compensation device can be set to a desired value above the ambient pressure using the pretensioning force of the spring.

The pressure compensation device is particularly preferably arranged in the piston rod. This results in a particularly space-saving arrangement of the pressure compensation device in the interior of the safety device. The pressure compensation device is preferably connected to the surroundings outside the housing (e.g. seawater) via a hole in the piston rod.

Preferably, the safety device also comprises a second mechanical interface by means of which it can be connected to the process valve. This allows the safety device on the process valve to be disconnected and replaced, and several safety devices to be connected in series to increase the force required to close the process valve.

Preferably, the safety device further comprises at least one sensor that is set up to detect the position of the piston and/or the piston rod.

Preferably, the safety device contains an indicator device which is set up to indicate the position of the piston and/or the piston rod on the outer side of the housing. The indicator device may include a physical indicator (e.g. a moving arrow) showing the position of the piston and/or piston rod on the outer side of the housing. The physical indicator can be mechanically connected to the piston and/or the piston rod. The display device can be used by an ROV and/or monitored via a camera.

The system according to the disclosure for actuating a process valve comprises at least one linear actuator and one or more safety devices as described above. The one or more safety devices are connected to the linear actuator via the first (and possibly second) mechanical interface.

Preferably, the system comprises several safety devices connected in series to increase the spring force for closing the process valve.

Further advantages and embodiments of the disclosure will emerge from the description and the accompanying drawings.

It is understood that the features specified hereinabove and those to be explained hereinafter can be used not only in the combination indicated in each case, but also in other combinations or on their own, without departing from the scope of the present disclosure.

The disclosure is illustrated schematically by means of exemplary embodiments in the drawings and is described in detail below with reference to the drawings.

BRIEF DESCRIPTION OF THE DRAWINGS

In the figures, identical elements are marked with identical reference signs. Therefore, a repetitive description is omitted where necessary.

DETAILED DESCRIPTION

Figure 1A:
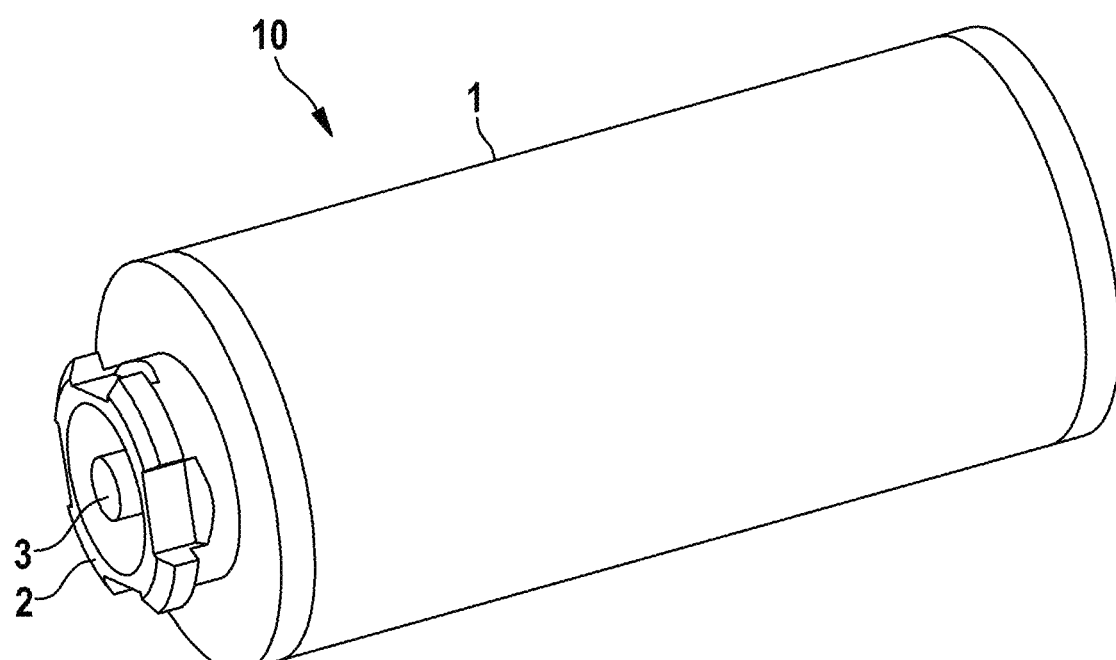
FIGS. 1a and 1b show a first preferred embodiment of a safety device according to the disclosure, in spatial external view and in longitudinal section.
Figure 1B:
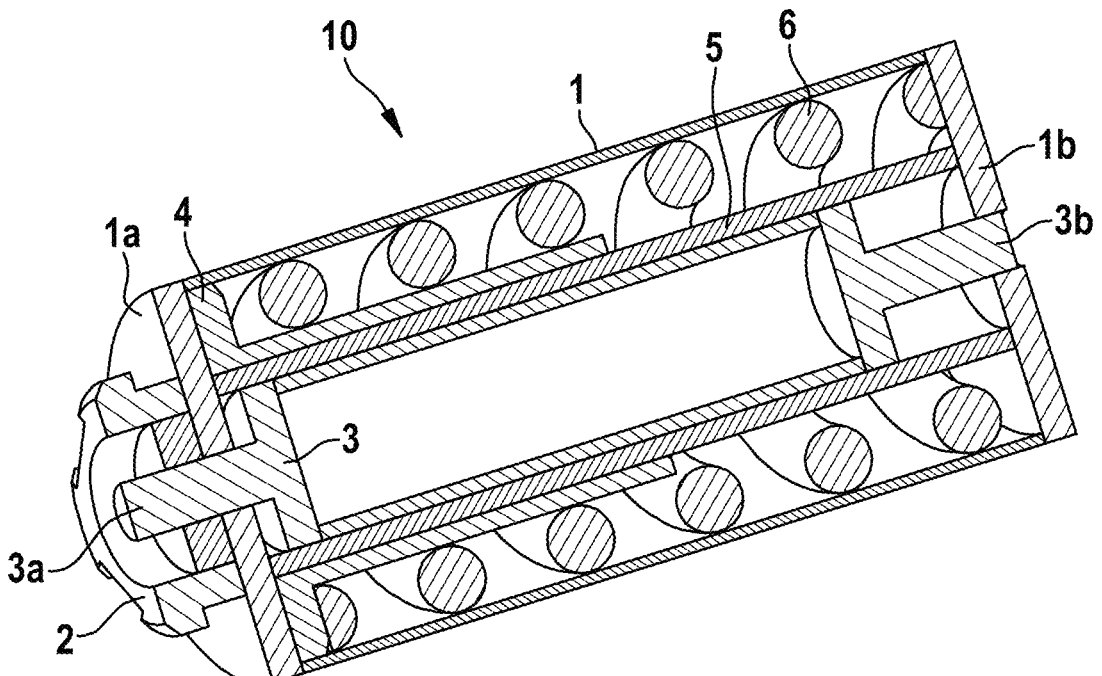

FIGS. 1a and 1b show a first preferred embodiment of a safety device 10 according to the disclosure. FIG. 1a shows this in a spatial external view and FIG. 1b shows it in longitudinal section. The illustrated safety device 10 comprises a housing 1, on the first end face 1a of which a mechanical interface 2 is attached. Interface 2 is described in more detail below in conjunction with FIG. 5.

The housing 1 is filled with a hydraulic fluid, such as hydraulic oil. A piston rod 3 is mounted so as to be axially displaceable in a bushing 5 in the housing 1. In this example, the piston rod 3 is hollow and conveniently contains openings for the hydraulic fluid to pass through (not shown). Bushing 5 also has openings for the hydraulic fluid to pass through (not shown). The piston rod 3 is connected to a piston 4.

A spring 6 is also arranged inside the housing 1, which surrounds the piston rod 3 and is clamped between the piston 4 and a second end face 1b of the housing 1. The ends 3a, 3b of the piston rod 3 pass through the end faces 1a, 1b of the housing.

In FIG. 1b, the safety device 10 is shown in a state in which the end 3a of the piston rod 3 is not subjected to an external force. Consequently, the spring 6 presses the piston 4 against the end face 1a of the housing 1, bringing the piston rod 3 with the piston 4 into a predetermined position (end position). This end position of the piston rod 3 means that when the piston rod 3 is connected at its end 3b to a process valve, the latter is brought into a safe position. Preferably, this is the closed position of the process valve.

Figure 2:
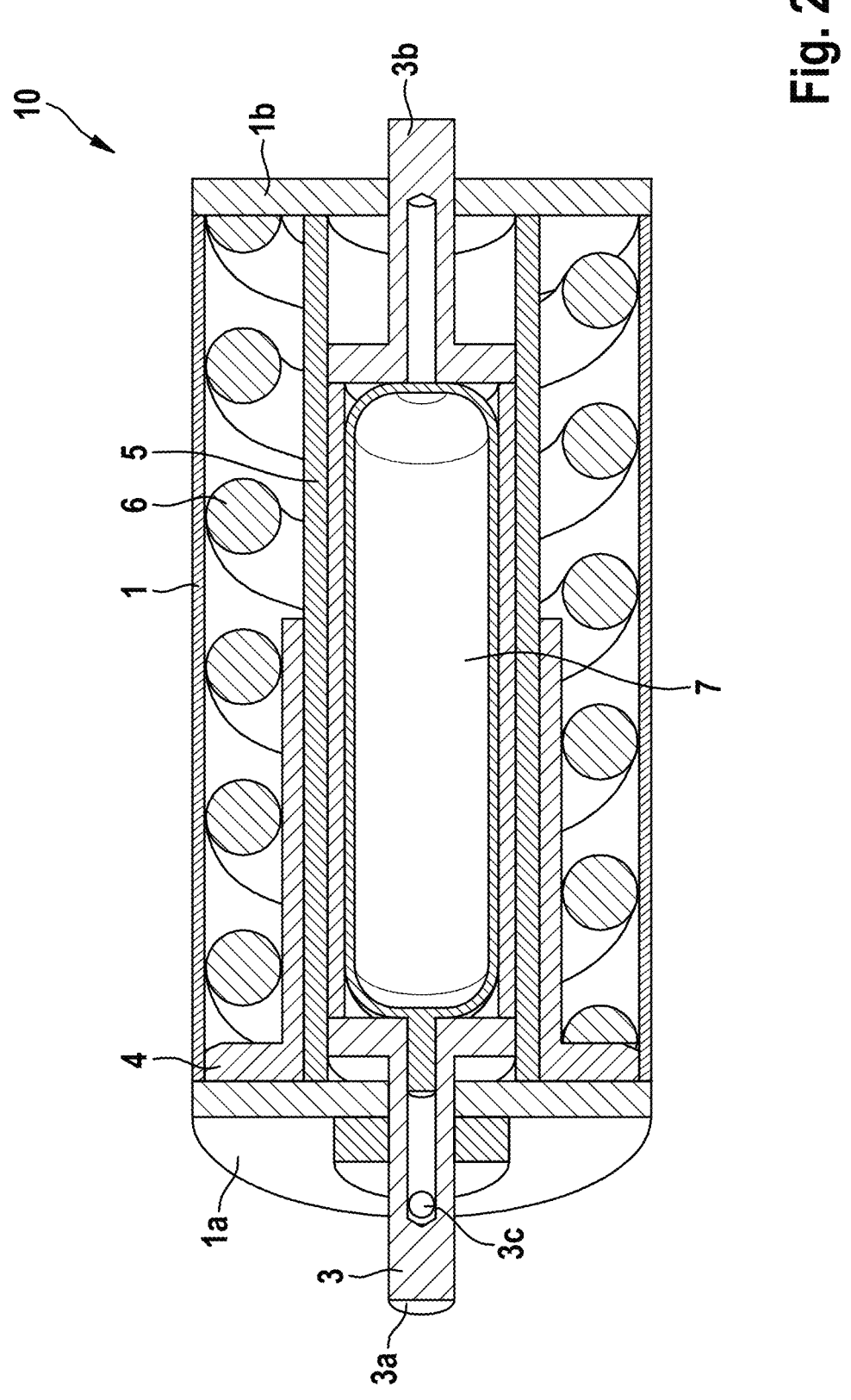
FIG. 2 shows a second preferred embodiment of the safety device according to the disclosure in longitudinal section.

FIG. 2 shows a second preferred embodiment of the safety device according to the disclosure in longitudinal section. In addition to the elements of the first embodiment of the safety valve according to the disclosure described in FIG. 1b, the second embodiment comprises a pressure compensation device 7, which is particularly useful for the use of the safety device in underwater applications. The pressure compensation device 7 shown in FIG. 2 is arranged inside the piston rod 3 and is designed as a bladder accumulator 7. The positioning of the bladder accumulator 7 in the piston rod 3 results in a particularly space-saving arrangement of the pressure compensation device 7. The bladder accumulator 7 is connected to the surroundings, e.g. the seawater, via a hole 3c in the piston rod 3. The bladder accumulator 7 can be designed with a flexible wall that encloses a predeterminable bladder accumulator volume and can move axially and radially in response to the pressure prevailing inside the piston rod 3. The flexible wall of the bladder accumulator 7 can be made of an elastomer, for example, and designed to be fluid-tight and resistant to contact with seawater under high pressure. At normal pressure, i.e. as long as the safety device is above water, the accumulator is empty and has the smallest possible volume. When submerged below the water surface, it fills with water as the external pressure rises and expands accordingly, resulting in pressure equalization between the internal and external pressure.

Figure 3A:
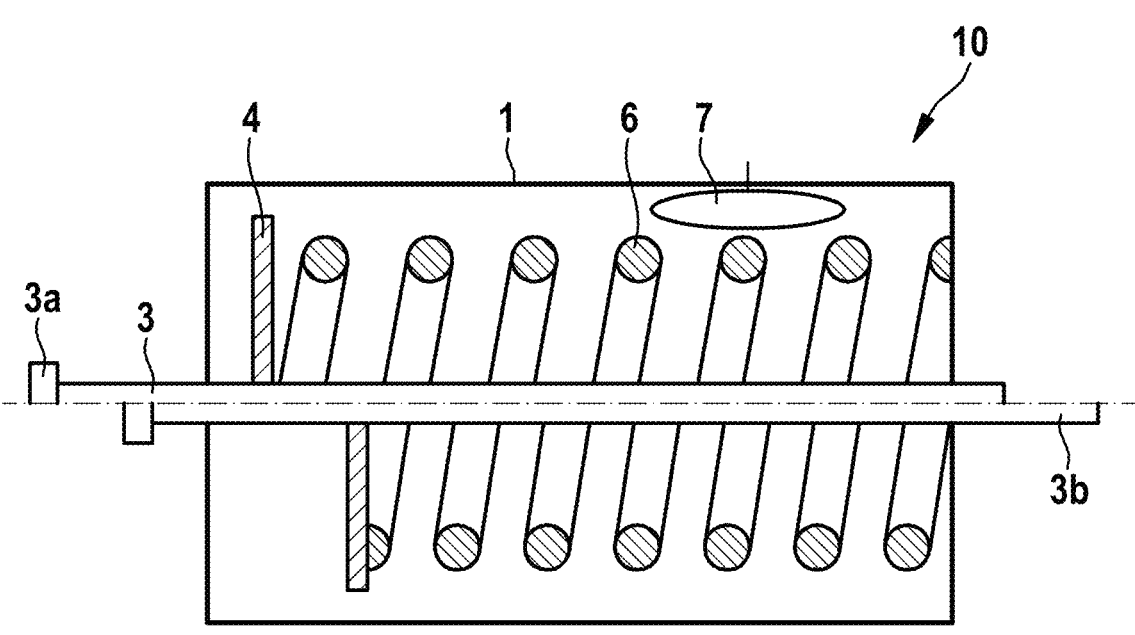
FIGS. 3a and 3b show a schematic representation of the second and a third preferred embodiment of the safety device, in each case in a relaxed and pretensioned state in longitudinal section.
Figure 3B:
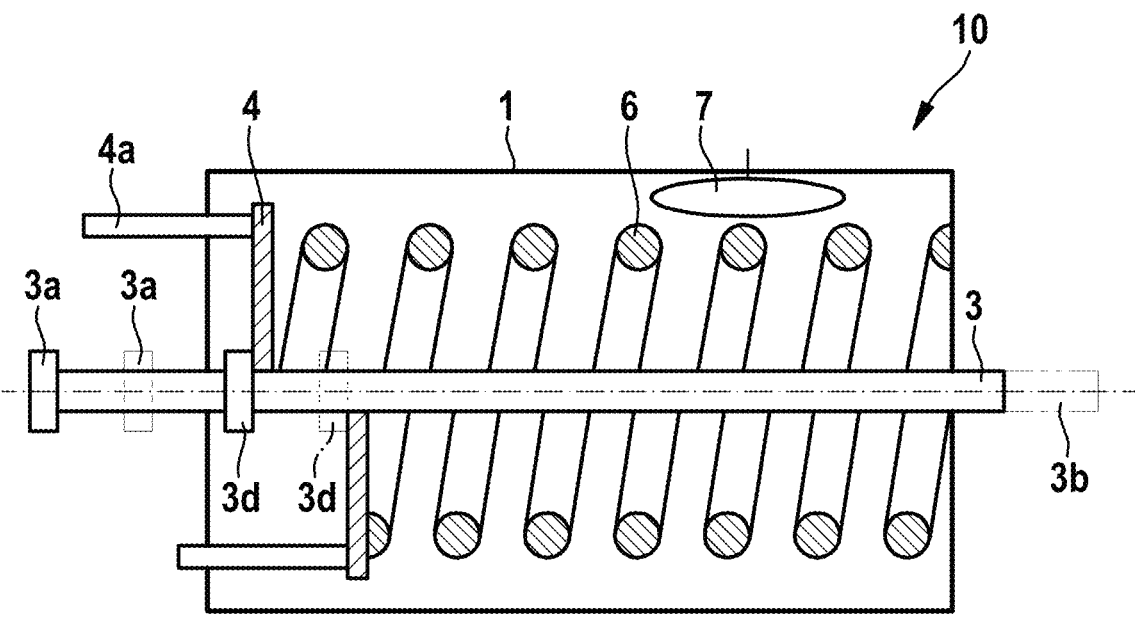

FIGS. 3a and 3b show a schematic representation of the second and a third preferred embodiment of the safety device 10 in longitudinal section.

FIG. 3a schematically shows the position of the components of the safety device 10 according to the second preferred embodiment when the spring 6 is relaxed (above the dotted center line) and when the spring 6 is pretensioned (below the dotted center line). If the end 3a of the piston rod 3 is not subjected to an external force, the spring 6 is in a relaxed state (shown above the dotted center line) and presses the piston rod 3 into the end position via the piston 4.

However, if an external force is applied to the end 3a of the piston rod 3, it moves in a direction opposite to the effective force of the spring 6 and compresses the spring 6 with the piston 4 so that it is pretensioned (shown below the dotted center line). In such a position of the piston rod 3, a process valve connected to the piston rod 3 at its end 3b is in an operating position, preferably in an open position.

FIG. 3b schematically shows the position of the components of the safety device 10 according to a third preferred embodiment when the spring 6 is relaxed (above the dotted center line) and when the spring 6 is pretensioned (below the dotted center line). In the third embodiment of the safety device 10 according to the disclosure, the piston is unidirectionally connected to the piston rod 3 via a driver 3d. Furthermore, the spring 6 is pretensioned independently of the movement of the piston rod 3 via a separate axis 4a, which, when force is applied, moves the piston in a direction opposite to the effective force of the spring 6, so that the spring 6 is pretensioned (shown below the dotted center line). Consequently, the process valve can be opened in normal operation with a lower force on the piston rod 3, as the spring force does not have to be overcome. This can be seen from the positions of the outer end 3a of the piston rod 3 and the driver 3d, which are shown solid in the end position of the piston rod and dashed when force is applied to the piston rod 3. It can be seen that the driver 3d does not come into contact with the piston 4 during normal operation. If the external force is not applied to the piston rod 3 and the axle 4a, the spring 6 expands and pushes the piston 4 in the direction of the end face 1a of the housing 1. This comes to rest on the driver 3d and thus moves the piston rod 3 into its end position, in which a process valve connected to the piston rod 3 at its end 3b is in a safe position (shown above the dotted center line).

Figure 4:
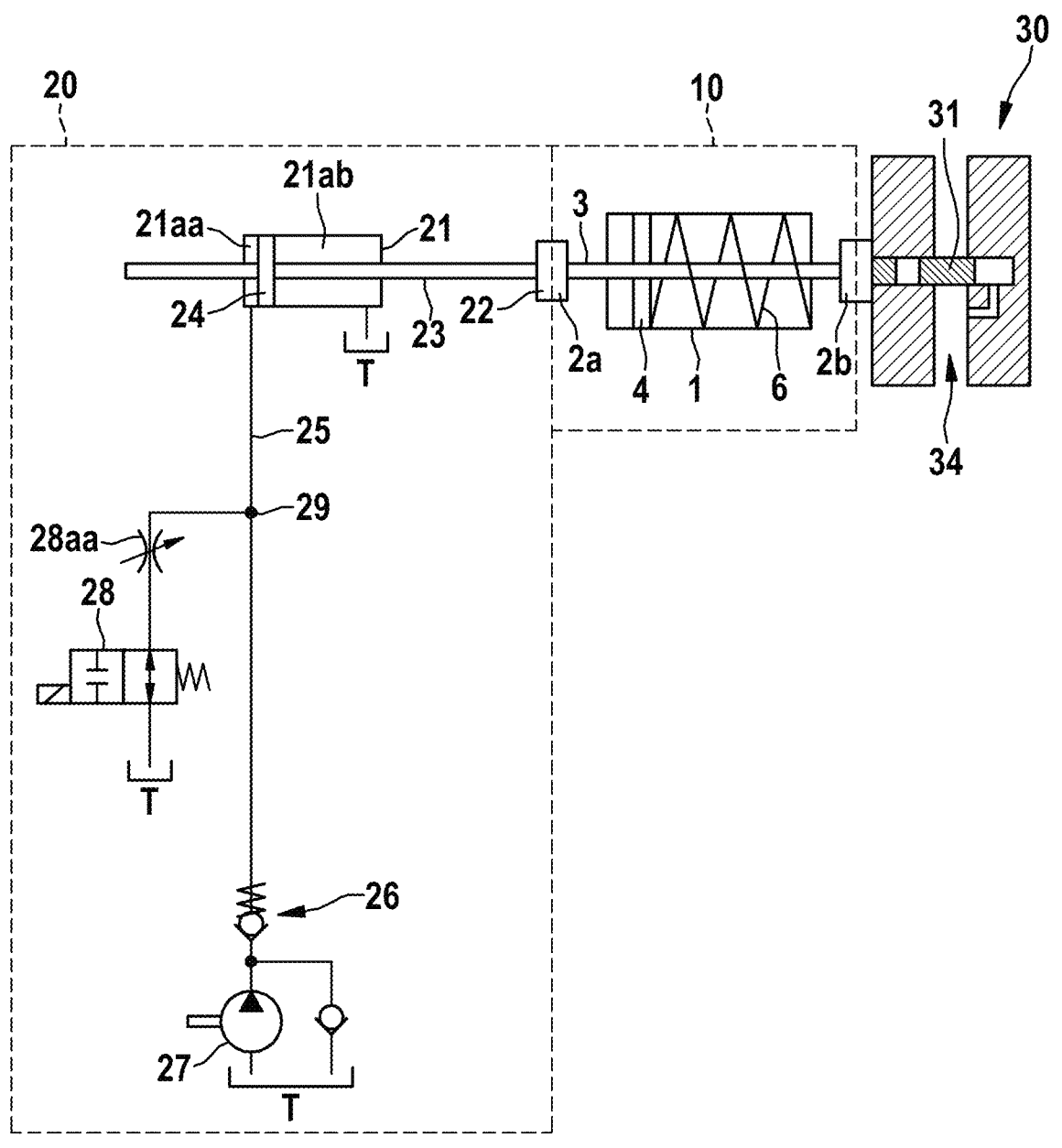
FIG. 4 shows a hydraulic circuit diagram of a linear actuator according to a preferred embodiment of the system according to the disclosure.

FIG. 4 shows a hydraulic circuit diagram of a linear actuator according to a preferred embodiment of the system according to the disclosure. The system shown comprises a linear actuator 20 and a safety device 10, which is connected to the linear actuator 20 by means of a first mechanical interface 2a. For this purpose, the first mechanical interface 2a of the safety device 10 is coupled to a corresponding interface 22 of the linear actuator 20. To couple the linear actuator 20, for example, it is attached to the safety device with interlocking interfaces 22, 2a and rotated by 45°. On a side opposite the first interface 2a (i.e. at the end 3b) of the safety device 10, a second interface 2b is arranged on the safety device 10, by means of which it can be connected to a process valve 30.

The process valve 30 shown comprises a disk 31 which opens and closes a valve channel 34 as a result of a movement of the piston rod 3 of the safety device 10.

The linear actuator 20 shown in FIG. 4 contains a pump 27 which delivers hydraulic fluid from an interior T of the linear actuator 20 via a line 25 into a working chamber 21aa of a hydraulic cylinder 21. The hydraulic cylinder 21 shown is designed as a constant-velocity cylinder and comprises a piston rod 23 to which a piston 24 is attached. The piston 24 separates the working chamber 21aa from a second cylinder chamber 21, which is hydraulically connected to the interior of the linear actuator 20. In addition, the linear actuator 20 contains a relief valve 28, which is also connected to the working chamber 21aa of the hydraulic cylinder 21 via the line 25. FIG. 4 shows the position of the hydraulic cylinder 21 with the relief valve 28 open, in which the working chamber 21aa has a minimum size, while the opposite cylinder chamber 21ab has a maximum size.

A non-return valve 26 is arranged in the line 25 between the pump 27 and a connection 29 of the pressure relief valve 28, which prevents the hydraulic fluid from flowing back into the pump 27 when the working chamber 21aa is relieved. In addition, a variable throttle 28aa is located upstream of the pressure relief valve 28, which can be used to control/regulate a quantity of hydraulic fluid flowing out of the working chamber 21aa.

If the relief valve 28 is opened, the spring force of the spring 6 of the safety device 10 acts on its piston 4 and displaces the piston rod 23 with the piston 24—via the piston rod 3 of the safety device 10 and the interface 2a, 22 between the safety device 10 and the linear actuator 20—until the working chamber 21aa has reached its minimum volume. In this state, shown in FIG. 4, the piston rod 3 with the piston 4 of the safety device 10 is in the predetermined position (end position) and the valve channel 34 of the process valve 30 is closed by the disk 31. Ideally, the relief valve 28 is a normally open valve (NO) that opens when the control voltage drops.

If, on the other hand, the relief valve 28 is closed and hydraulic fluid is delivered from the pump 27 into the working chamber 21aa, the force of the hydraulic cylinder 21 acts against the spring force of the spring 6 of the safety device 10, so that the spring 6 is pretensioned/compressed. The piston rods 23, 3 of the linear actuator 20 and the safety device 10 move against the direction of the spring force and displace the associated disk 31 of the process valve 30 in such a way that the valve channel 34 is opened (not shown).

Figure 5:
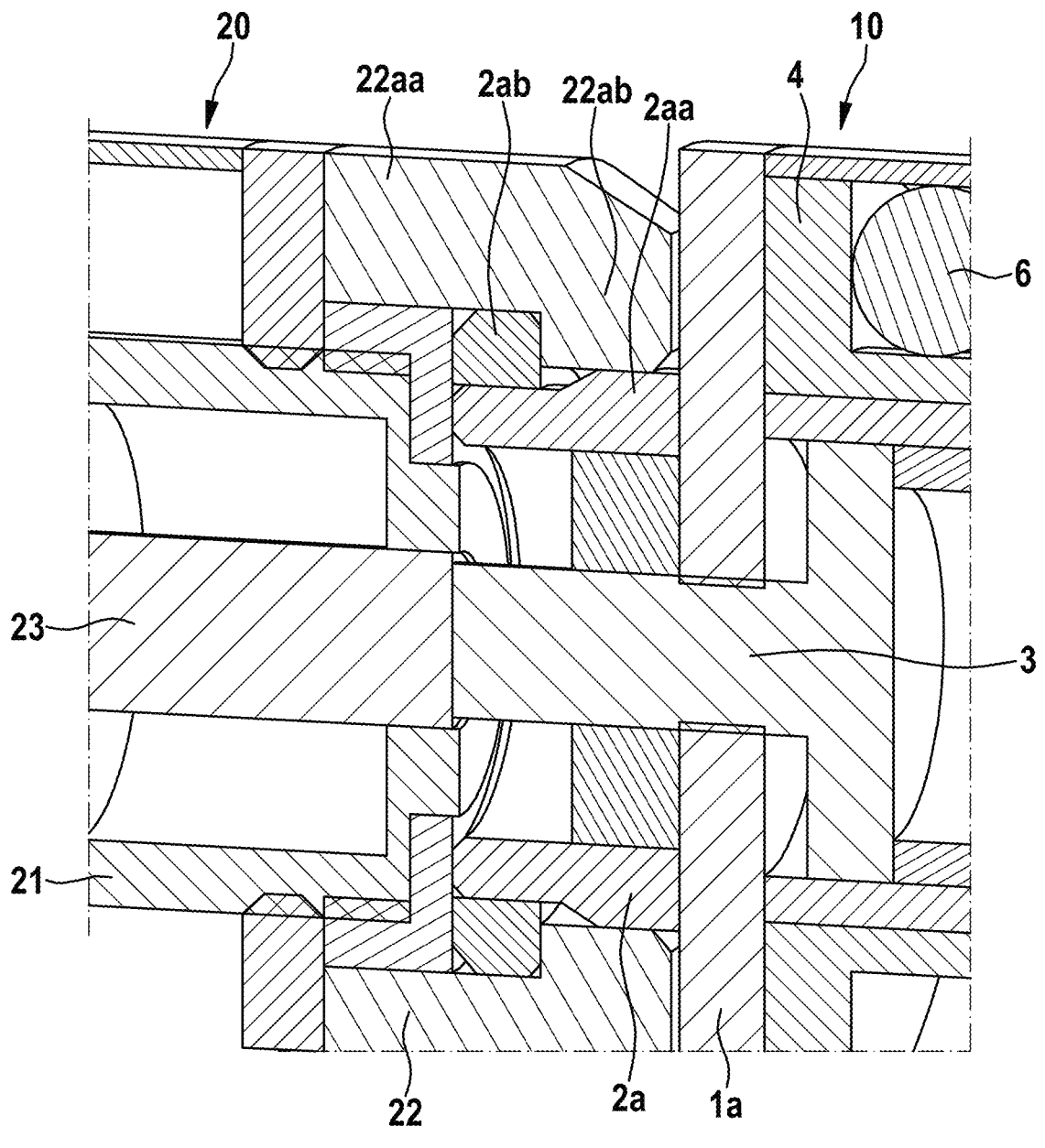
FIG. 5 shows an example of a mechanical interface between a linear actuator and a safety device according to a preferred embodiment of the system according to the disclosure in longitudinal section.

FIG. 5 shows an example of a mechanical interface between a linear actuator and a safety device according to a preferred embodiment of the system according to the disclosure in longitudinal section. A section of the safety device 10 is shown on the right-hand side of FIG. 5, showing parts of the piston rod 3, the piston 4 and the spring 6 as well as the end face 1*a* of the housing 1 facing the linear actuator 20 with the first mechanical interface 2*a*. Interface 2*a* is designed as a quick-release fastener ("linear (push) interface", type A or type C) in accordance with EN ISO 13628-8. It comprises a first shaft 2*aa*, around which a flange 2*ab* with recesses (not shown) is arranged. The linear actuator 20 is coupled to this interface 2*a* by means of the interface 22, which is the counterpart of the quick-release fastener. The section of the linear actuator 20 shown on the left-hand side of FIG. 5 shows a part of the hydraulic cylinder 21 with the piston rod 23 facing the safety device 10 in addition to the interface 22. The interface 22 of the linear actuator 20 comprises a second shaft 22*aa* with claw-shaped projections 22*ab* in the manner of an inner flange, which embrace the flange 2*ab* of the safety device 10. To connect the linear actuator 20 to the safety device 10, the claw-shaped projections 22*ab* are pushed into the recesses (not shown) of the flange 2*ab* in the axial direction and brought into engagement with the flange 2*ab* by rotating the linear actuator 20 by 45° clockwise. Thus, in the closed state of the quick-release fastener 2*a*, 22 shown in FIG. 5, the claw-shaped projections 22*ab* are in axial and radial contact with the flange 2*ab* of the first shaft, so that a positive connection of the two sides of the quick-release fastener 2*a*, 22 is produced. Due to this connection by means of the quick-release fastener 2*a*, 22, the opposite ends of the piston rods 23, 3 of the linear actuator 20 and the safety device 10 are friction-locked together.

The quick-release fastener 2*a*, 22 makes it possible in particular to replace the linear actuator 20 with an ROV without having to remove or open the safety device. This significantly simplifies maintenance and installation of the linear actuator, especially at great depths.

Figure 6:
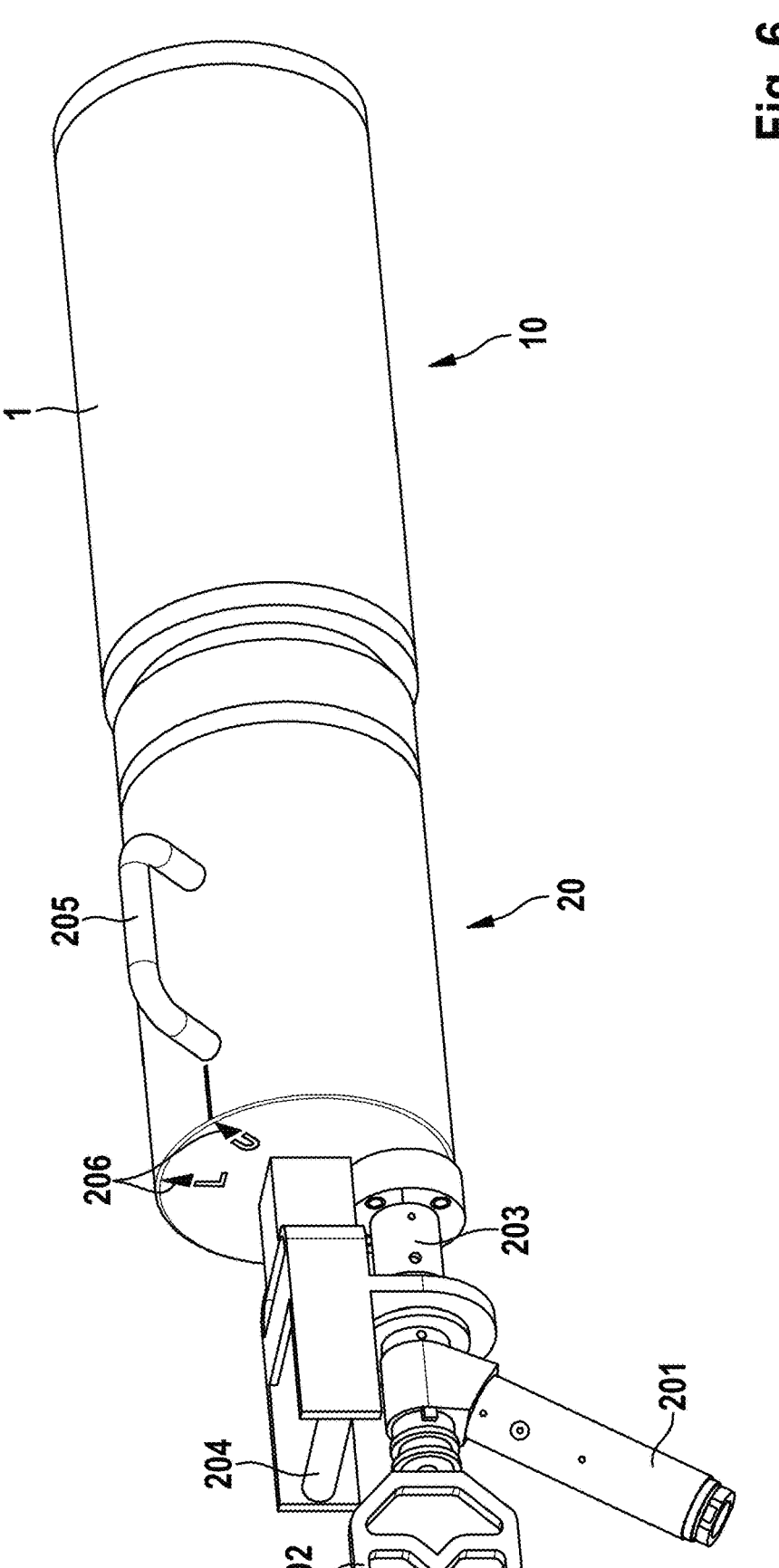
FIG. 6 shows a linear actuator and a safety device according to a preferred embodiment of the system according to the disclosure in a spatial external view.

FIG. 6 shows a linear actuator and a safety device according to a preferred embodiment of the system according to the disclosure in a spatial external view. In this figure, the linear actuator 20 and the safety device 10 are connected by means of the quick-release fastener 2*a*, 22, as shown in FIG. 5. Standardized handles 202, 204, 205 are attached to the outer side of the linear actuator 20 for mounting/dismounting the linear actuator 20 using an ROV.

There is also a cable guide 201 on the end face of the linear actuator 20, which leads to a plug connection 203 to which the power supply for an electronic control unit 40, the electric drive unit 41 and the valves 28, 28*a* is connected.

Furthermore, an indicator device 206 (shown schematically) is arranged on the end face of the linear actuator, which indicates the position of the piston 24, 4 and/or the piston rod 23, 3 of the linear actuator 20 and the safety device 10. According to FIG. 6, the display device is in position U ("unlocked"), i.e. the system consisting of linear actuator 20 and safety device 10 is in a normal operating state, in which the working chamber 21*aa* of the hydraulic cylinder 21 is pressurized and occupies its maximum volume, so that neither the piston 24 of the hydraulic cylinder nor the piston 4 are in contact with their end stops (see FIG. 4).

The handle 202 allows the ROV to disconnect the electrical wiring of the linear actuator 20 at the plug connection 203. This interrupts the power supply to the pump 27 and the relief valve 28, so that the relief valve 28 opens and the pressure in the working chamber 21*aa* of the hydraulic cylinder 21 drops. As a result, the pistons 4, 24 of the safety device 10 and the linear actuator 20 are pushed into their respective end stops by the spring force of the spring 6 (see FIG. 4) and the indicator device changes to position L ("locked").

Subsequently, the ROV can separate the linear actuator 20 from the safety device 10 by means of the handle 204 and the quick-release fastener 2*a*, 22 (see FIG. 5) by rotating it counterclockwise by 45°. The handle 205 can subsequently be used to transport the linear actuator 20.

The disclosure provides a compact and simple safety device for linearly actuated process valves as a separate module that has purely mechanical properties. The safety device offers a very simple and compact fail-safe mechanism that is based on proven springs and does not require an electric, pneumatic or hydraulic drive. The spring force of the at least one spring in the safety device automatically moves the process valve to a predefined position (e.g. open or closed) if the actuating force drops (e.g. in the event of an actuator fault, power failure, deactivation or removal of the actuator). The modular design of the components, which provides for the safety device separately from a linear actuator, can be used to simplify the design of new systems or to retrofit existing ones.

The invention claimed is:

1. A safety device for a linearly actuated process valve, comprising:
   a housing;
   a piston rod which is mounted in the housing so as to be linearly displaceable and connectable to the process valve;
   a piston which is connected to the piston rod;
   at least one spring which is clamped between the piston and an end face of the housing; and
   a first mechanical interface by way of which the safety device is detachably connected to a linear actuator; and
   a pressure compensation device which is designed to equalize the pressure between the surroundings and an interior of the safety device,
   wherein the pressure compensation device is arranged in the piston rod.

2. The safety device according to claim 1, further comprising a pretensioning mechanism which is set up to pretension the at least one spring independently of a movement of the piston rod.

3. The safety device according to claim 1, wherein the housing is filled with a hydraulic fluid.

4. The safety device according to claim 1, wherein the pressure compensation device is set up to adjust a pressure in the interior of the safety device in a range between ambient pressure and 10 bar above the ambient pressure.

5. The safety device according to claim 1, further comprising a second mechanical interface by way of which the safety device is connected to the process valve or a further safety device.

6. The safety device according to claim 1, further comprising:
   at least one sensor which is set up to detect the position of the piston and/or the piston rod, and
   a display device which is set up to display a position of the piston and/or the piston rod on an outer side of the housing.

7. A system for linear actuation of a process valve, comprising:

at least one linear actuator; and one or more safety devices according to claim 1, wherein the one or more safety devices is connected to the linear actuator by way of the first mechanical interface.

8. The system according to claim 7, further comprising a plurality of safety devices connected in series.

\* \* \* \* \*